P. E. KING & G. J. WITTMANN.
VEHICLE TIRE.
APPLICATION FILED MAY 16, 1916.
1,220,516. Patented Mar. 27, 1917.
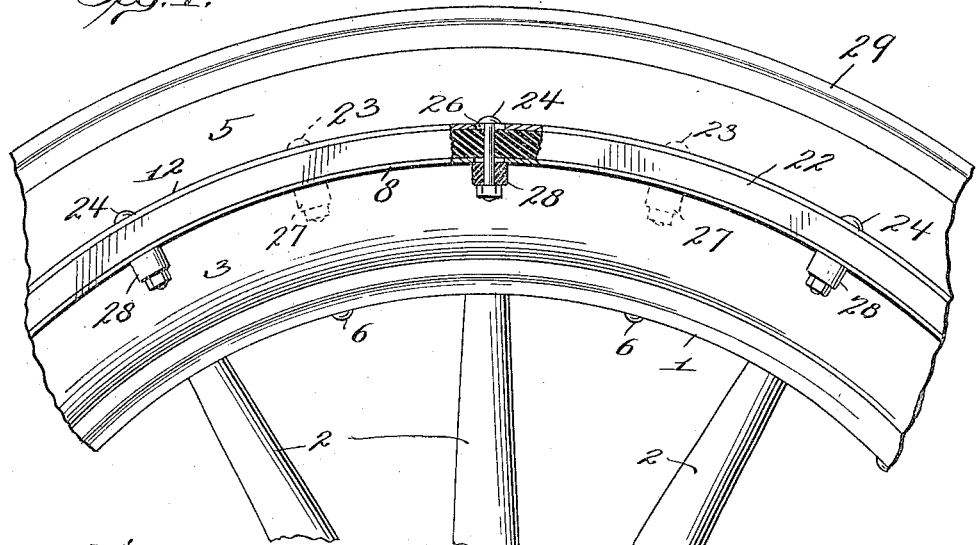
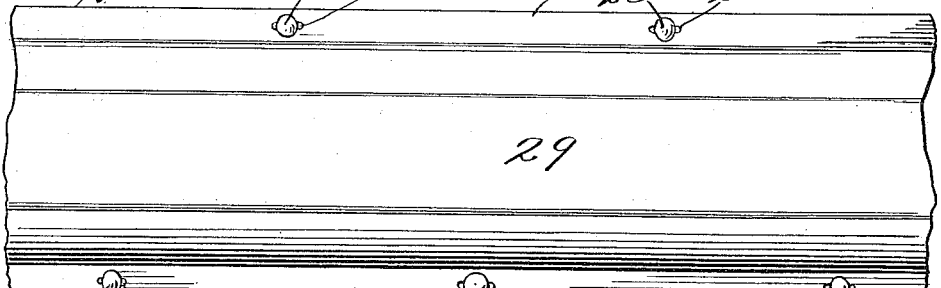
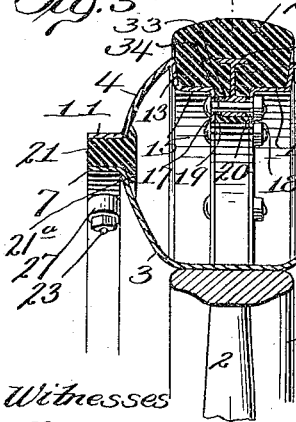
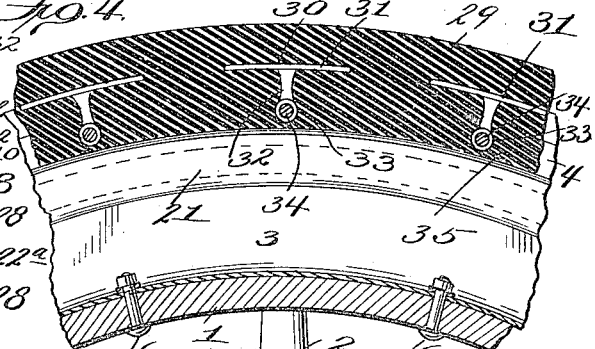

UNITED STATES PATENT OFFICE.

PERCIVAL E. KING AND GEORGE J. WITTMANN, OF NEWBURGH, NEW YORK.

VEHICLE-TIRE.

1,220,516.  Specification of Letters Patent.  Patented Mar. 27, 1917.

Application filed May 16, 1916. Serial No. 97,900.

*To all whom it may concern:*

Be it known that we, PERCIVAL E. KING and GEORGE J. WITTMANN, citizens of the United States, residing at Newburgh, in the county of Orange and State of New York, have invented new and useful Improvements in Vehicle-Tires, of which the following is a specification.

The present invention relates to improvements in vehicle tires, and more especially to those of the class adapted to be used upon automobiles and similar vehicles. The primary object of the invention is to provide a tire which is more durable than the ordinary pneumatic tire and which avoids the difficulties experienced with such tires such, for example, as punctures and blow-outs, and yet the tire affords ample resilience to insure smooth and easy riding qualities.

The tire comprises generally complemental annular casing sections of segmental or channel cross-section, these casing sections being composed of resilient metal or other material, rubber or other resilient cushions interposed between the casing sections, and a tread of rubber or other suitable material to roll silently on the ground or road surface, the resilience of the tire being afforded primarily by the casing sections and the interposed resilient cushions, assisted by the resilience of the tread which insures silent operation of the tire.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 represents a part of a vehicle tire in side elevation and partly in section constructed in accordance with the present invention.

Fig. 2 represents a view of the same looking inwardly from the periphery of the tire.

Fig. 3 represents a transverse section through the tire, and

Fig. 4 represents a section on the line 4—4 of Fig. 3.

Similar parts are designated by the same reference characters in the several views.

The present invention is applicable generally to vehicle wheels of various types where it is desirable or necessary to provide resilience. Tires embodying the present invention are especially adapted for use on automobiles where a considerable amount of resilience is desirable or necessary. The tire shown in the accompanying drawing is particularly adapted for use upon automobiles, and this tire will be hereinafter described in detail. It is to be understood, however, that the invention is not restricted to the precise construction shown, as equivalent constructions are contemplated and will be included within the scope of the claims.

In the present instance, 1 represents a portion of the felly of the wheel, this felly connecting, as usual, the outer ends of the spokes 2. The tire in that embodiment of the invention shown comprises an inner casing section 3 and a pair of outer casing sections 4 and 5. The inner casing section 3 is segmental or channel-shaped in cross-section, it being shown as approximately semi-circular in cross section, and this inner casing section is mounted on and secured to the wheel felly 1. Preferably, and as shown, that part of the inner casing section which rests upon the felly is flattened to provide a substantial seat for the tire on the felly, and this inner casing section is secured at suitable intervals to the felly by bolts or equivalent devices 6 which may pass through the felly and the adjacent part of the inner casing section. The edges of the inner casing section are turned outwardly in opposite directions to form continuous annular flanges 7 and 8, and these flanges are provided at appropriate intervals with apertures 10. Preferably, these apertures 10 are staggered relatively to one another. The outer casing sections 4 and 5 are smaller in cross-section, they being preferably in the form approximately of quarter circles. The side edges of these outer casing sections are out-turned to form continuous out-turned flanges 11 and 12, these flanges occupying positions in parallelism with the flanges 7 and 8 of the inner casing section, and the opposite edges of the outer casing sections 4 and 5 are turned first inwardly to form the walls 13 and 14, thence turned toward one another to form the tread seats 15 and 16, and they are finally turned inwardly to form the flanges 17 and 18, these flanges being spaced apart and provided with apertures 19 and 20.

The casing sections 3, 4 and 5 are composed, preferably, of spring steel or other resilient metal of a thickness and quality that will afford the desired or necessary amount of resistance for the tire under the weight of the vehicle equipped with the tire. It is to be understood that these casing sections are continuous annular rings and that they are assembled with their channeled or hollow sides arranged toward one another. Cushions 21 and 22 are interposed between the complemental flanges 7 and 11 and 8 and 12, respectively. These cushions are of a character which will permit the flanges 11 and 12 to move toward or from the complemental flanges 7 and 8 as the tire passes over irregularities in the road surface. Preferably strips of rubber are employed as cushions, and these strips extend around the tire continuously between the flanges 7 and 11 and 8 and 12, respectively. The cushions, therefore, serve the additional function of sealing the interior of the tire from mud or water. Preferably, and as shown, the inner edges of the cushions are provided with inner flanges 21$^a$ and 22$^a$ to exclude mud and water. Separation of the outer casing sections 4 and 5 relatively to the inner casing section may be prevented in different ways. Preferably, and as shown, the flanges 7 and 11 and 8 and 12 are connected at suitable intervals by bolts or equivalent devices 23 and 24, these bolts extending through the apertures 10 and 25 in the flanges 7 and 11, respectively, and 10 and 26 in the flanges 8 and 12, respectively. The apertures 10, 25 and 26 are preferably staggered relatively to one another as stated, and they are also elongated in a circumferential direction or formed as slots in order to permit the necessary relative movements between the casing sections 4 and 5 and the casing sections 3 during the action of the tire, without interference by the connecting bolts 23 and 24. Cushion washers 27 and 28 are also provided at the inner sides of the flanges 7 and 8. As shown, the heads of the bolts engage the outer sides of the flanges 11 and 12 and the nuts or opposite heads of the bolts engage the cushion washers 27 and 28. With this arrangement, the cushions 21 and 22 in conjunction with the cushion washers 27 and 28 will permit relative movement of the flanges 11 and 12 both toward and from the flanges 7 and 8, and yet a tight joint will be maintained between these flanges of the casing sections.

A tread 29 is mounted in the periphery of the tire. This tread is preferably of a material which will insure a silent rolling of the tire upon a pavement or road surface, rubber of appropriate quality being suitable for the purpose. The casing sections 4 and 5 provide a seat for the tread, the tread resting upon the tread seats 15 and 16 and being confined laterally between the walls 13 and 14. Suitable means is provided for retaining the tread in its seat. Preferably, and as shown, the tread has embedded therein at appropriate intervals circumferentially thereof a suitable number of anchors 30, each anchor embodying, preferably, a segmental anchor plate 31, a shank 32 which extends inwardly from the anchor plate toward the inner circumference of the tread and an eye 33 at the inner end of the shank. The casing sections 4 and 5 are held together laterally at their peripheries and the tread is retained in position in its seat by a suitable number of bolts or equivalent devices 34 which extend through the apertures 19 and 20 of the in-turned flanges 17 and 18 and also through the eyes 33 of the respective anchor plates. It is also preferable to form the tread with an inwardly directed rib 35 which, when the tread is in position, occupies a position between the in-turned flanges 17 and 18 of the casing sections 4 and 5. With this construction, the flanges 17 and 18 of the casing sections 4 and 5 are held together, the tread is securely anchored at intervals in its seat, and a tight joint to prevent entrance of mud or water into the chamber formed by the casing sections is provided.

In operation, the casing formed of the resilient sections 3, 4 and 5 affords the major portion of the resilient action, these sections of the casing flexing incident to irregularities in the surface over which the tire rolls. The resilience of the casing is supplemented by the rubber or other resilient cushions 21 and 22, these cushions being compressed, more or less, as the tire rolls over an irregular surface. Silent rolling of the tire upon the pavement or road is insured by the tread, and this tread will also afford a proper grip or hold for the tire upon the pavement or road to prevent slipping or skidding of the tire. Owing to the interposition of the cushions and the tread between the meeting flanges or edges of the metallic casing sections, noise, such as would result should these flanges operate directly upon one another, is avoided. Obviously the tire may be manufactured inexpensively from rolled sheet metal of appropriate kind and thickness and it may be assembled easily and at small cost. Should the tread or the cushions become worn or deteriorated they may be readily renewed without the expense of replacing the metal casing. Obviously a tire of this construction is not subject to punctures, blow-outs or other difficulties which are experienced with pneumatic tires employing an air tube, and the tire is not subject to breakage such as occurs often with the so-called solid rubber or cushion tires.

What is claimed is:

1. A vehicle tire comprising a casing composed of resilient sections of segmental cross-section having opposed circumferentially extending edges, cushions interposed between said opposed edges and forming closed joints between them, and means for securing said cushions in position between the respective edges of said casing sections.

2. A vehicle tire comprising a casing composed of annular resilient sections of segmental cross-section having opposed laterally extending circumferential flanges, cushions interposed between said opposed flanges and closing the spaces between them, and means coöperative with said flanges of the casing sections to secure said cushions in position between them.

3. A vehicle tire comprising a casing composed of annular resilient sections of segmental cross-section, said sections presenting opposed circumferential flanges, a strip of cushioning material extending circumferentially and continuously between each pair of said flanges, and means extending through and uniting said flanges and the interposed cushioning strips.

4. A vehicle tire comprising a resilient annular section of segmental cross-section adapted to be secured to a wheel felly and having its outer edges out-turned to form circumferential flanges, a complemental resilient annular section of segmental cross-section at the outer side of the section first mentioned and having its inner edges out-turned to form circumferential flanges, annular cushions extending circumferentially between the flanges of the said sections, and means extending through and securing together said flanges and the respective cushions.

5. A vehicle tire comprising a casing composed of annular resilient sections of segmental cross-section, said sections presenting opposed circumferential flanges, cushions between said flanges to resist relative movement of the flanges toward one another, devices connecting said flanges and retaining them in coöperative relation, and cushions coöperating with said connecting devices and yieldingly resisting relative separating movement of the flanges.

6. A vehicle tire comprising annular complemental resilient metal casing sections of segmental cross-section assembled with their hollow sides facing one another, cushions interposed between the meeting edges of the sections, and a tread of relatively soft material seated in the periphery of the tire.

7. A vehicle tire comprising a resilient annular metal casing, said casing having a circumferentially extending depressed seat formed in its periphery, a tread of relatively soft material in said seat and having anchoring devices embedded therein, and devices extending transversely through portions of the casing and through said anchoring devices and the tread to retain the tread in said seat.

8. A vehicle tire comprising a resilient annular metal casing having an annular depressed tread seat in its periphery and opposed parallel flanges at the inner side of the seat, a tread of relatively soft material having its body portion resting in said seat and having an annular rib on its inner periphery interposed between said flanges, and devices connecting said flanges and clamping the rib of the tread between them.

In testimony whereof we have hereunto set our hands in presence of two subscribing witnesses.

PERCIVAL E. KING.
GEORGE J. WITTMAN.

Witnesses:
GEORGE A. LIEMER,
WILLIAM HEWITT.

Copies of this patent may be obtained for five cents each, by addressing the "Commissioner of Patents, Washington, D. C."